United States Patent
Shiu

(10) Patent No.: US 6,585,113 B2
(45) Date of Patent: Jul. 1, 2003

(54) STRUCTURE OF A SCREW STRAP COMBINATION

(76) Inventor: Cheng-Horng Shiu, P.O. Box 82-144, Taipei (TW)

( * ) Notice: Subject to any disclaimer, the term of this patent is extended or adjusted under 35 U.S.C. 154(b) by 95 days.

(21) Appl. No.: 09/970,699

(22) Filed: Oct. 5, 2001

(65) Prior Publication Data

US 2003/0066771 A1 Apr. 10, 2003

(51) Int. Cl.⁷ .................................. B65D 85/24
(52) U.S. Cl. ........................ 206/344; 206/443
(58) Field of Search ......................... 206/338, 343, 206/344, 345, 346, 347, 443, 820

(56) References Cited

U.S. PATENT DOCUMENTS 5,409,111 A * 4/1995 Takumi ..................... 206/344
5,758,768 A * 6/1998 Habermehl et al. ......... 206/347

* cited by examiner

*Primary Examiner*—Jacob K. Ackun
(74) *Attorney, Agent, or Firm*—Leong C. Lei

(57) ABSTRACT

An improved structure of a screw strap combination is disclosed. The screw strap combination having a strap body and a plurality of screws is characterized in that the strap body is a flat board having one lateral surface being mounted with a plurality of clipping devices for the securing of the screws, and two protruded enhancing blocks are provided on the other lateral surface of the strap body, corresponding to the clipping device, wherein the clipping device includes at least three semi-circular clipping rings arranged in parallel on the lateral surface and the distance between each clipping ring is substantially equal to the width of the screw groove of the screw, thereby the three semi-circular clipping rings secure the screw at the adjacent screw grooves of the screw and allow straight screwing of the screw onto a fastening article.

3 Claims, 5 Drawing Sheets

STRUCTURE OF A SCREW STRAP COMBINATION

BACKGROUND OF THE INVENTION (a) Field of the Invention

The present invention relates to an improved structure of a screw strap combination, and in particular, a screw strap combination having a plurality of clipping devices to prevent a plurality of screws mounted on the screw strap from biasing downward which allows vertically mounting of the screws into a fastening object.

(b) Description of the Prior Art

FIGS. 1, 2 or 3 show a conventional screw strap having a plurality of screws used for fastening by means of a fastening device. The strap body A is made from a rigid plastic material and is a flat board-like structure. On one lateral surface of the strap body A, there are a plurality of mounting rings B to hold a plurality of screw C. These screws C can be mounted horizontally. However, the screws C is only secured by the mounting ring B at the screw thread C1, as a result, the screw C is not horizontally secured at the mounting ring C (refer to FIG. 3) and when the screw C is touched at one end by a fastening means D, such as a screw driver, the screw C will bias downward and the mounting of the screw C will not be in a vertical position (as shown in FIG. 2).

Referring to FIGS. 4, 5, 6 and 7, there is shown another conventional screw strap combination structure. One of the surfaces of the strap body E is provided with a plurality of mounting rings F, F' arranged in two for a row, from top to the bottom of the strap body E. A screw G is secured by the two mounting rings F, F' and the radius of the mounting rings F, F' is larger as compared with that of the screw G so that the thread G1 of the screw G can be engaged by the mounting rings F, F' (as shown in FIGS. 6 and 7).

In actual fact, the screw G is not properly secured by the mounting rings F, F' and therefore, the screw G positioned on the strap body E will bias downward and when the screw G is driven by an electrical screw driver, the screw G may either be slantingly mounted or dislocated. In other words, the screws G mounted on a conventional screw strap cannot be vertically mounted onto a fastening article. Accordingly, it is an object of the present invention to provide an improved structure of a screw strap combination which mitigates the above drawback.

SUMMARY OF THE INVENTION

Accordingly, it is an object of the present invention to provide an improved structure of a screw strap combination, wherein the strap combination comprises a strap body and a plurality of screws, characterized in that the strap body is a flat board having one lateral surface being mounted with a plurality of clipping devices for the securing of the screws, and two protruded enhancing blocks are provided on the other lateral surface of the strap body, corresponding to the clipping device, wherein the clipping device includes at least three semi-circular clipping rings arranged in parallel on the lateral surface and the distance between each clipping ring is substantially equal to the width of the screw groove of the screw, thereby the three semi-circular clipping rings secure the screw at the adjacent screw grooves of the screw and allow straight screwing of the screw onto a fastening article.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 3:
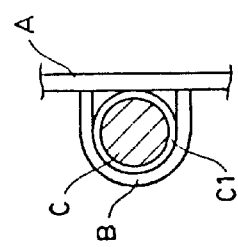
FIG. 3 is a sectional view of a conventional screw strap.
Figure 2:
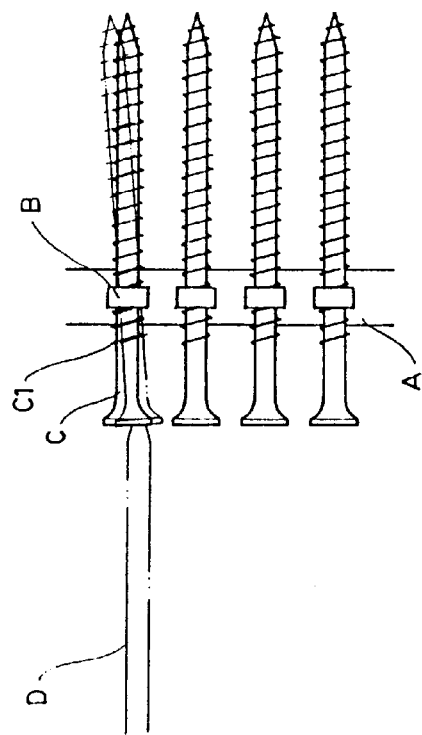
FIG. 2 is an elevation view of a conventional screw strap.
Figure 1:
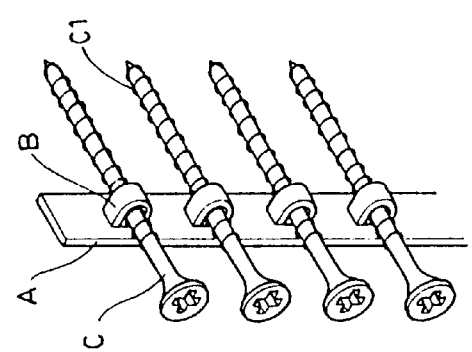
FIG. 1 is a perspective view of a conventional screw strap.
Figure 5:
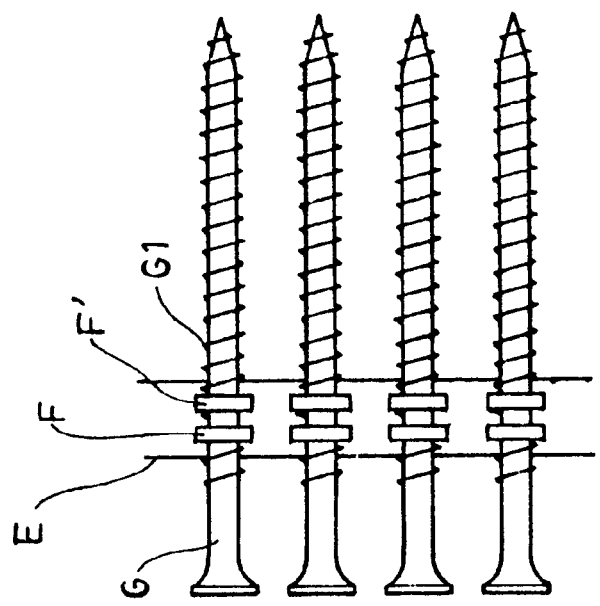
FIG. 5 is an elevation view of another conventional screw strap.
Figure 4:
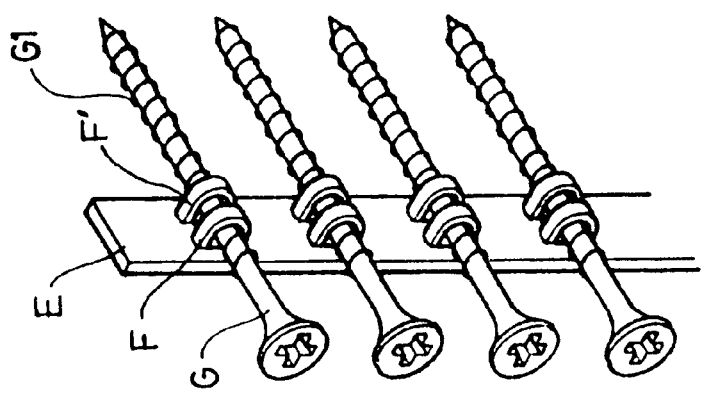
FIG. 4 is a perspective view of another conventional screw strap.
Figure 7:
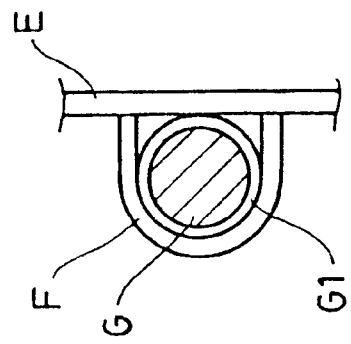
FIG. 7 is a sectional view of another conventional screw strap.
Figure 6:
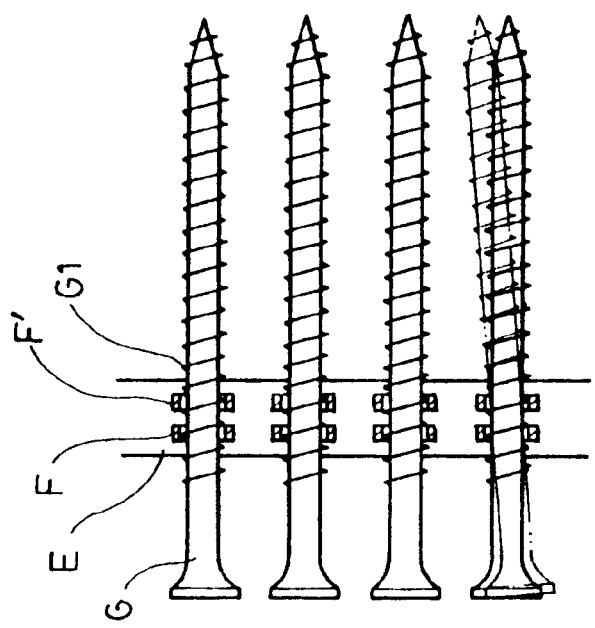
FIG. 6 is a side-sectional view of another conventional screw strap.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 9:
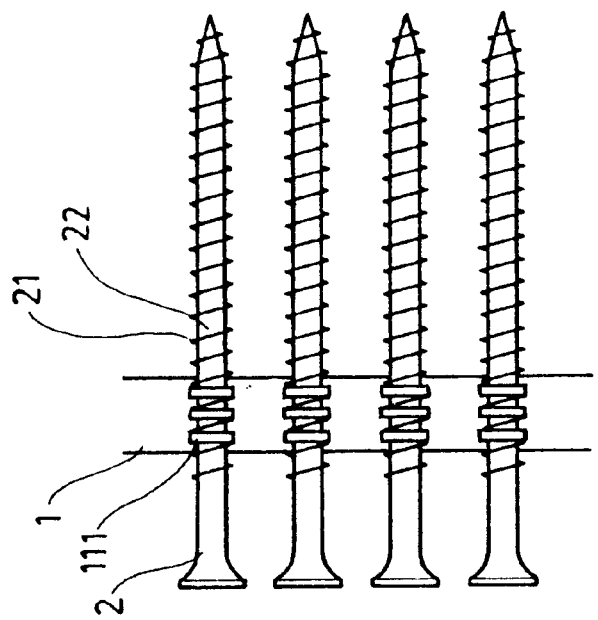
FIG. 9 is an elevation view of a screw strap of the present invention.
Figure 8:
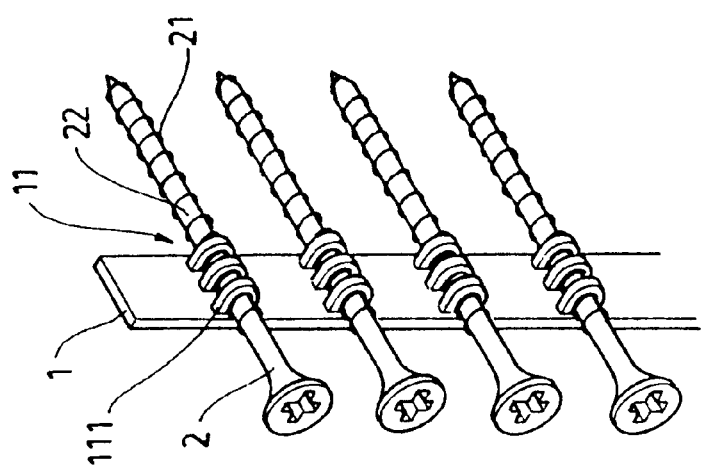
FIG. 8 is a perspective view of a screw strap of the present invention.
Figure 11:
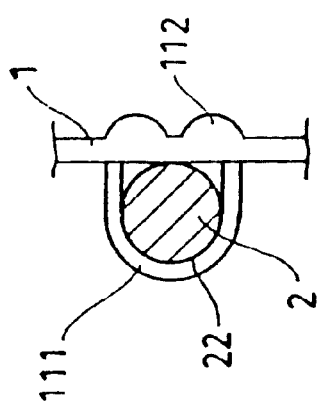
FIG. 11 is a sectional view of a screw strap of the present invention.
Figure 10:
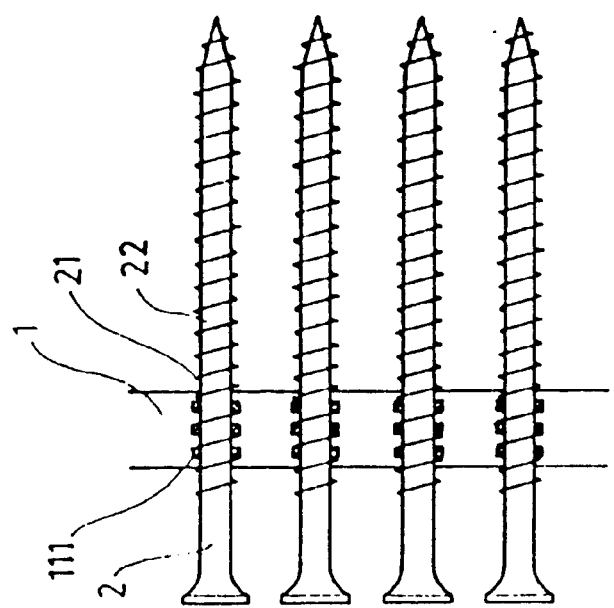
FIG. 10 is a side-elevation view of a screw strap of the present invention.

Referring to FIGS. 8, 9, 10 and 11, there is shown a screw strap combination having a strap body 1 and a plurality of screws 2, wherein the strap body 1 is made from a rigid plastic material by ejection molding, and is a flat plate-like or a flat board structure. On one surface of the strap body 1, there are a plurality of rows of clipping devices 11 arranged from the top of the body strap 1 to the bottom of the body strap 1. The clipping device 11 includes three semi-circular clipping rings 111 arranged in parallel to each others and the distance between each of the clipping rings 111 is equal to the width of the width of the screw groove 22 of the screw 2.

On the other surface of the strap body 1, two protruded enhancing blocks 112 are provided and are directly corresponding to the clipping device 11. These enhancing blocks 112 prevent the screw 2 which is secured by the three semi-circular clipping rings 111 from detaching from the strap body 1. This ensures that all the screws 2 are intact to the strap body 1 before they are fastened onto a fastening article. In accordance with the present invention, the clipping devices 11 are arranged in horizontal.

The distance between each of the clipping rings 111 is substantially equal to the width of the screw groove 22 of the screw 2, and the distance between two clipping rings 111 is exactly the distance between each screw thread 21 in axial direction of the screw 2. Therefore, when the screw 2 is mounted horizontally into the clipping rings 111, these rings 111 are exactly enclosed the screw grooves 22 and the screw 2 is secured onto the strap body 1 ready for implementation by a screw-fastening device (not shown).

In accordance with the present invention, there are two protruded enhancing blocks 112 mounted on other surface of the strap body 1 opposite to the clipping rings 111. As the enhancing blocks 112 are mounted correspondingly to the clipping rings 111, the securing of the clipping rings 111 onto the strap body 1 is thus enhanced by the enhancing blocks 112 from detaching from the strap body 1 to ensure proper mounting of the screws 2 onto a fastening article (not shown).

In view of the above, the present screw strap combination holds the screws in a horizontal position and the screws will not bias downward as a result of the three semi-circular rings 111. Thus, these screws can be mounted or fastened onto a fastening object vertically without biasing. In accordance with the present invention, the screw strap combination improves the working efficiency of fastening articles.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A screw strap combination having a strap body and a plurality of screws, characterized in that the strap body is a flat board having one lateral surface being mounted with a plurality of clipping devices for the securing of the screws, and two protruded enhancing blocks are provided on the other lateral surface of the strap body, corresponding to the clipping devices, wherein each clipping device includes at least three semi-circular clipping rings arranged in parallel on the lateral surface and the distance between each clipping ring is substantially equal to the width of the screw groove of the screw, thereby the three semi-circular clipping rings secure the screw at the adjacent screw grooves of the screw and allow straight screwing of the screw onto a fastening article.

2. The screw strap of claim 1, wherein the strap body is made of a plastic material.

3. The screw strap of claim 1, wherein the three semi-circular clipping rings are spaced equally apart.

* * * * *